April 22, 1958  D. FINLAYSON ET AL  2,831,748
PROCESSS FOR MELT SPINNING CRIMPED FILAMENTS
Filed Feb. 25, 1953  2 Sheets-Sheet 1

D. FINLAYSON
A. HARCOLINSKI
B. KRZESINSKI
INVENTORS

ATTORNEYS

April 22, 1958 D. FINLAYSON ET AL 2,831,748
PROCESS FOR MELT SPINNING CRIMPED FILAMENTS
Filed Feb. 25, 1953 2 Sheets-Sheet 2

D. FINLAYSON
A. HARCOLINSKI
B. KRZESINSKI
INVENTORS

ATTORNEYS

United States Patent Office 2,831,748
Patented Apr. 22, 1958

2,831,748

PROCESS FOR MELT SPINNING CRIMPED FILAMENTS

Donald Finlayson, Antoni Harcolinski, and Boleslaw Krzesinski, Spondon, near Derby, England, assignors to British Celanese Limited, a corporation of Great Britain Application February 25, 1953, Serial No. 338,834

Claims priority, application Great Britain February 26, 1952

6 Claims. (Cl. 18—54)

This invention relates to textile products and in particular to products comprising melt-spun fibres of cellulose acetate or like thermoplastic material. In this specification the term "fibres" includes continuous filaments as well as staple fibres and "melt-spun" means extruded in a temporarily plastic condition brought about by heat in the absence of volatile solvents for the thermoplastic material.

U. S. application S. No. 243,994, filed August 28, 1951, describes forming melt-spun continuous filaments of cellulose acetate or other thermoplastic material. According to that method fibre-forming thermoplastic material in powder form is urged (e. g. by a rapidly reciprocated tamper) against one face of a heated plate having spinning orifices therein so that the powdered material is fused by heat applied to the plate, fresh material is continually supplied to the plate, and the fused material is drawn away through said orifices in the form of filaments. The following example illustrates the process of said application.

*Example 1*

Figure 1:
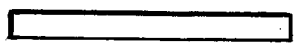
Figure 2:

The apparatus used was as shown in Figures 1 and 2 of British Patent No. 719,853 corresponding to U. S. application S. No. 243,994 and comprised a plate having a well in the flat bottom of which were two rows of 300 orifices each of 0.02" diameter, means for continually feeding powdered material to said well, means for heating the plate electrically so as to melt the material, a ram arranged to reciprocate rapidly in said well so as to force the fused material through said holes, and means comprising a draw-roller for drawing the material away from the holes in the form of filaments at constant speed and winding the filaments up without twist.

The thermoplastic material was in the form of a powder of a cellulose acetate containing 53% of combined acetic acid, made by ripening a primary acetate at a temperature substantially above atmospheric temperature after neutralizing residual catalyst, stabilizing the ester by heating under pressure with water at a temperature above the boiling point, and grinding so that the material passed through a gauze of 30 meshes per inch but was retained by one of 60 meshes.

The powder was heated for 15 minutes at 200° C. and, after cooling, was fed to the apparatus. The temperature of the plate was kept at 235° C. The ram was reciprocated at a rate of 1400 strokes per minute. The material was drawn away at a rate of 10 meters per minute in the form of an untwisted sliver of filament denier 10, the cross-section of the filaments being circular. The plate temperature specified, in common with the other plate temperatures mentioned in this specification, was the temperature of the plate near the orifice, as indicated by a thermocouple. The temperature of the material immediately above the orifice was estimated to be somewhat higher, perhaps 20° C. higher in every case.

The filaments spun in this way show a surprising difference from dry-spun filaments of the same material in that they can be exposed to boiling water without substantial change, whereas dry-spun filaments when so exposed become delustred and crinkled. This difference is perhaps connected with the fact that the melt-spun filaments are completely free from solvent and that at no stage in the formation of the filaments have the molecules been spaced apart either by solvent molecules or molecules of water.

We have now found that by melt-spinning with drawdown under special conditions leading to asymmetry in the cross-section of the filaments, products can be obtained which when exposed to boiling water, even for no longer than a few seconds, acquire a pronounced crimp and may also lose their lustre. This capacity to acquire a crimp as the result of a short aqueous treatment is of great value. The crimped filaments are more flexible and of greater elasticity and extension than uncrimped dry-spun or melt-spun filaments. In consequence they are more amenable to textile processing, especially when this involves subjecting the material to sudden stresses, as for example in carding crimped staple fibres made according to the invention, in weaving, and in knitting. Moreover, yarns of the crimped filaments, or of staple fibres made therefrom, are of greater covering power than similar yarns of uncrimped material and commonly have twice the voluminosity of similar uncrimped yarns, and staple fibres of the crimped material give spun yarns of improved strength for a given twist.

In spinning so as to obtain a readily crimpable filament of the invention, the following factors are important.
  (i) The cross-sectional shape of the die-orifice.
  (ii) The draw-down.
  (iii) The temperature of extrusion.
  (iv) The nature of the thermoplastic material.

The die orifice should preferably not be circular. It is possible although not easy, even with circular orifices to obtain products that can be crimped in hot water, but the filaments obtained are much inferior to those spun from non-circular orifices. The crimping of such filaments commonly takes at least 10 times as long as for filaments spun from more suitably shaped orifices. Moreover, to obtain the crimping properties in such filaments, higher temperatures and higher draw-downs are necessary and in consequence the tensile properties of the filaments are inferior. The orifices that have been found most satisfactory are of elongated cross-section, i.e. the length of the cross-section (referred to hereinafter for brevity as the length of the orifice) is substantially greater than the average width. By the length of the orifice is meant the length of the longest line that could be drawn within the perimeter of the cross-section such that each point on the line is as far from the perimeter on one side of the line as on the other. By the width of the orifice at a point along the length is meant twice the distance of the perimeter from the line at that point. Preferably the length of the orifice is at least 2.5 times the width thereof at a certain distance from one end, said distance being greater than one third and not greater than half said length. By the average width of the orifice is meant the ratio of the area of the cross-section to its length. A high ratio of length to average width, i. e. a ratio of 5:1 to 10:1 or more is conducive to obtaining the desired asymmetry of cross-section in the filaments, possibly owing to variation in the rate of flow at different points along the length of the orifice. Even more effective are restrictions in width along the length. Thus, for example, in a preferred form of orifice the width varies along the length and in so doing passes in turn through a maximum, a minimum and a second maximum and the greatest width is at least 1.5 times (e. g. 2 to 4 times) said minimum. The length of the orifice may, with advantage, be 5 to 10 times that minimum. The shape of the orifice may be that of a plurality of intersecting circles, the diameter of the circles being such and their centres being so arranged as to give the desired relation between length, average width, minimum width and greatest width. Preferably the circles differ in diameter, the ratio of maximum and minimum diameter being, for example, from 1.3:1 to 2.5:1.

Figure 3:
Figure 4:
Figure 5:
Figure 6:
Figure 7:
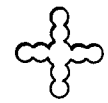
Figure 8:

In the accompanying drawings Figures 1 to 8 show, all on the same scale, the profiles of various die orifices that have been used successfully in carrying out the invention. The dimensions of the various orifices can be ascertained from the fact that in the orifice of Figure 1 the long side of the rectangle is 0.22". Orifices having the shape of a plurality of intersecting circles, the centres of which lie on a straight line as shown in Figures 3 to 5 of the drawings, are generally better than substantially rectangular orifices such as those of Figures 1 and 2. Orifices formed of intersecting circles, the centres of which lie on a zig-zag line, as in Figure 6, on a cross as in Figure 7, or on a substantially arcurate line as in Figure 8 are still better as will be shown below. The provision of a suitably shaped orifice alone, however, does not ensure ready crimpability in the filament. Attention must also be directed to the other factors specified in the list above and it is the combination of all these factors that gives the desired result. The denier of the filaments formed should not be too high since very thick filaments do not crimp readily, i. e. the width of the thinnest part of the cross-section should not be too great. Since the extent to which the filaments can be drawn down is not unlimited this affects the choice of suitable sizes of orifice. Useful results have been obtained with orifices of areas ranging from 0.001 to 0.005 square inch and with minimum thicknesses ranging from 0.008" to 0.015". For these orifices the ratio of perimeter in inches to area in square inches ranges from 90 to 150 reciprocal inches. Instead of drawing each filament from a single orifice we may draw a single filament from a group of orifices, e. g. from a group of circular holes in line, so close together that the material from all of them can be brought together while it is still sufficiently fluid to coalesce. The requirements set out above as to the relationship that the various dimensions of a suitable orifice should bear to one another when each orifice produces a single filament, apply mutatis mutandis to groups or orifices from which a single filament is formed.

By the draw-down is meant the ratio of the area of the die orifice to the cross-sectional area of the filament produced therefrom. In spinning a particular thermoplastic material through a particular orifice, if the temperature of extrusion be fixed, the draw-down is controlled by the rate at which the filaments are wound up (the draw off rate). Increasing the temperature while keeping the draw off rate constant decreases the draw-down, since at the higher temperature more material passes in unit time from the die orifice. In consequence the higher the temperature the higher the rate of draw off must be to obtain a given draw-down. Actually the draw-down should be greater the higher the temperature to obtain the best results. Increase in temperature therefore should preferably be accompanied by a considerable increase in the rate of draw off. Some trials carried out at relatively low spinning temperatures suggest that at these temperatures there is an optimum rate of draw off (and presumably an optimum draw-down) beyond which the crimping property of the filament falls off. With the higher temperatures at which it is preferred to work however, e. g. temperatures of 280 to 320° C. in the case of cellulose acetate and like cellulose derivatives, no such optima have been found. On the contrary it has been found that, within this temperature range the higher the draw-down, the more readily the filaments crimp other things being equal. It is preferred to work at temperatures that are relatively high for the particular thermoplastic material and to effect a draw-down of at least 100. The best results have been obtained at draw-downs above 500, e. g. between 1000 and 3000. In general higher draw-down is called for when the die orifice has at least two axes of symmetry and in particular when it is substantially rectangular or has the shape of intersecting circles of equal diameter spaced along a straight line. The draw-down should be effected so that the filaments are elongated in cross-section and preferably more elongated than the orifice as well as being asymmetrical. To assist in obtaining the desired asymmetry the filaments may be drawn away from the die aperture at an angle, e. g. so that their path makes an angle of less than 45° with the die face. This expedient is particularly useful at low spinning temperatures.

By the temperature of extrusion or the spinning temperature is meant the temperature of the die very close to the orifice or to the central orifice in a multihole die. All the temperatures specified herein were measured at a distance of one millimeter from the edge of the orifice. The spinning temperature should be well up above the minimum temperature at which the thermoplastic material can be melt-spun and in general the best results have been obtained at temperatures nearer the maximum temperatures which the thermoplastic materials can withstand. With certain shapes of orifice, e. g. those formed from intersecting circular holes of different diameters, an optimum temperature has been found above which the crimpability of the resulting filaments decreases. In spinning cellulose acetate, for instance, through the orifice shown in Figure 8 the optimum temperature was found to be about 280° C. This effect of temperature and also the effect of varying the draw-off speed when spinning secondary cellulose acetate through this orifice is shown in the following table in which the quality of the crimp obtained by immersing the filaments in boiling water for 10 seconds is indicated by the frequency, i. e. the number of crimps per inch.

| Draw-off speed, m./minute | Frequency of crimp | | |
|---|---|---|---|
| | 260° C. | 280° C. | 293° C. |
| 20 | 20 | 8 | 5 |
| 50 | 32 | 19 | 10 |
| 100 | | 25 | 16 |
| 200 | | 32 | 23 |
| 300 | | 35 | 28 |

For orifices composed of intersecting holes of equal diameter such as those of Figures 3, 4 and 5 no such optimum temperature was found: the crimpability as indicated by the frequency of the crimp obtained by the hot water treatment specified, increases with the temperature throughout the whole range investigated. The same appears to be true with substantially rectangular orifices.

With regard to the nature of the thermoplastic material the best results have been obtained, other things being equal, with materials having a relatively rigid molecular structure (especially cellulose esters of carboxylic acids containing 2 to 4 carbon atoms), and of high average molecular weight.

It must be emphasized that ready crimpability is not an unavoidable result of melt spinning through non-circular orifices with draw-down under conditions leading to asymmetry in the filaments. This result is obtained only if the degree of asymmetry and the draw-down are sufficient, i. e. if for the particular thermoplastic material and orifice the temperature and rate of draw-off are adequate. Small differences in asymmetry and draw-down may be critical. This is shown in Figures 9 to 18 of the accompanying drawings which will be referred to below. The ultimate test of whether the spinning conditions and die orifice selected are appropriate for the particular material is whether in fact the filaments obtained undergo a pronounced crimp when immersed in boiling water for not more than one minute. To determine suitable conditions for a particular material it is best to start with an orifice such as that of Figure 8 of the drawings, and control the temperature to a value a little more than half way between the minimum and maximum melt spinning temperatures for the material, the draw-off being effected at a speed giving a draw-down of about 100. The speed may then be progressively raised keeping the temperature constant if the crimpability at a draw-down of about 100 is inadequate. If at a draw-down of around 1000 the crimpability of the filaments is still inadequate the temperature may be raised and the draw-off still further increased to a value between 1000 and 3000.

In the accompanying drawings, Figures 9 to 18 show, all on the same scale, the profiles of cross-sections of groups of filaments obtained by spinning by the general method of Example 1 with orifices of various shapes and under various conditions. The scale of these figures relative to that of Figures 1 to 8 is slightly less than 200:1.

Figure 9:
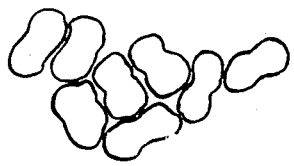

The filaments shown in Figure 9 were spun from secondary cellulose acetate through the die orifice shown in Figure 3 at 280° C. Although showing some asymmetry and considerable draw-down (as can be ascertained by comparing their dimensions with that of the die orifice) they were not readily crimpable.

Figure 10:
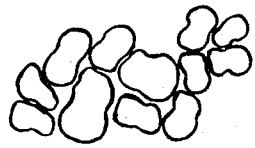

The filaments shown in Figure 10 were obtained in the same way but by spinning at 303° C. with higher draw-down (as can be seen from their dimensions). They crimped readily. It will be observed that they show a greater degree of asymmetry than the filaments of Figure 9.

Figure 11:

The filaments shown in Figure 11 were spun from secondary cellulose acetate through the die orifice shown in Figure 4 at 270° C. They did not crimp readily. The filaments shown in Figure 12 were spun in the same way but at 315° C. and with a much greater draw-down as is clear from the dimensions of the cross-sections. They crimped very readily.

Figure 13:

The filaments shown in Figure 13 were spun from secondary cellulose acetate through the orifice shown in Figure 5 at 265° C. In spite of the high draw-down and substantial asymmetry they did not crimp readily. The filaments shown in Figure 14 were spun in the same way but at 303° C. They crimped readily.

Figure 15:
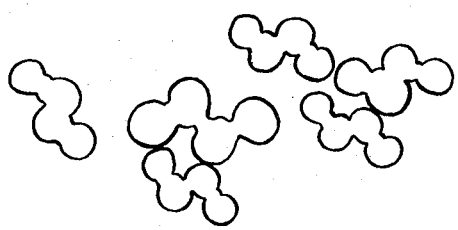
Figure 12:
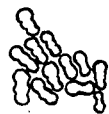
Figure 16:
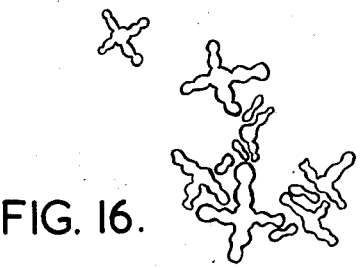
Figure 17:
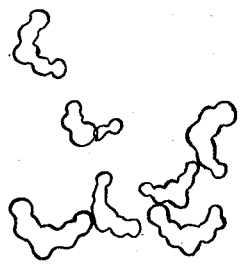
Figure 14:
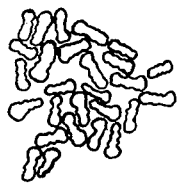
Figure 18:

The filaments shown in Figures 15, 16 and 17 were spun from the orifices shown in Figures 6, 7 and 8 respectively at temperatures of 292° C., 270° C. and 288° C. respectively. The filaments shown in Figure 18 were spun from cellulose triacetate (61.4% combined acetic acid) through the orifice shown in Figure 8 at 290° C. All these filaments crimped very readily. Those shown in Figures 17 and 18 developed some crimp on mere relaxation of tension without any specific treatment.

In carrying out the spinning, the thermoplastic material while being melted on the plate may be exposed to the atmosphere. It is of advantage, however, particularly when spinning at high temperatures, for the material to be kept out of contact with oxygen, or at least with oxygen at as high a pressure as the oxygen in air at atmospheric pressure. The air over the plate may be replaced by an inert gas, e. g. nitrogen; or, as described in U. S. application Serial No. 292,772, filed June 10, 1952, a zone of subatmospheric pressure may be maintained over the material on the plate.

The following examples further illustrate the process of the invention:

Example 2

The spinning was carried out as in Example 1 except for the following differences:

The spinning orifice was as shown in Figure 4, the plate was kept at a temperature of 280° C. and the draw roller was run at a speed giving a filament denier of 10.

The twistless tow obtained was hanked and immersed in hank form first in cold water and then for 5 seconds in water at 95° C. This treatment gave the material a pleasant subdued lustre and a crimp in which the distance between successive peaks was about 0.1". The immersion in cold water is not essential but facilitates the subsequent crimping.

Example 3

The spinning was carried out as in Example 2 except that the orifice was a rectangular slit of dimensions 0.22" x 0.02" as shown in Figure 1, the plate was kept at a temperature of 260° C. and the filaments were drawn off at 10 meters per minute.

Examples 4 and 5

The process was carried out as in Example 3 except that the orifices shown in Figures 2 and 5 respectively were used.

Example 6

The process was carried out as in Examples 4 and 5 except that the orifice was as shown in Figure 3, the space above the plate was enclosed as described in U. S. application S. No. 292,772, and the pressure therein kept at 15" of mercury, the temperature of the plate was kept at 340° C. and the rate of draw-off was 345 metres per minute, the draw-down being approximately 1130.

| Example | Die aperture | Temperature (°C.) | Take-up speed (m./minute) | Filament, Denier |
|---|---|---|---|---|
| 7 | As in Fig. 3 | 321 | 420 | 5.2 |
| 8 | do | 303 | 320 | 3.8 |
| 9 | As in Fig. 4 | 303 | 200 | 6.7 |
| 10 | do | 303 | 60 | 18 |
| 11 | As in Fig. 5 | 303 | 320 | 8 |
| 12 | As in Fig. 8 | 256 | 50 | 6.6 |
| 13 | do | 285 | 150 | 8.9 |
| 14 | do | 298 | 400 | 8.4 |

In Examples 7, 9 and 11 spinning was effected under atmospheric pressure, in Example 8 at 15" of mercury, in Example 10 at 18" and in Examples 12 to 14 at 10". Except for Example 14 in which the thermoplastic material was cellulose triacetate, all the trials were carried out on secondary cellulose acetate of 53% combined acetic acid content. All the products of Examples 3 to 14 crimped readily when treated as described in Example 2, but for each orifice the best results were obtained at the higher temperatures and draw-downs.

Readily crimpable filaments have also been obtained from cellulose propionate of 66.7% combined propionic acid, cellulose acetate propionate ("Hercose M. P."), cellulose acetate-butyrate ("Hercose C"), benzyl cellulose of high benzyl content, polystyrene, 4-4-polyurethane, 6-6-nylon and polyethylene terephthalate, by applying the methods of the foregoing examples.

Although orifices of one or other of the shapes shown in Figures 1 to 8 of the drawings are preferred, the orifice may have other shapes. It may, for example, have the shape of a curved or sinuous slit or of a slit running into a circular hole which may intersect one or more other circular holes the circles having their centres on an extension of the long axis of the slit. Good results have also been obtained from orifices comprising several circular intersecting holes of different diameters their centres arranged along a straight line. These orifices may have a single axis of symmetry or two axes at right angles. Draw-off at a uniform rate has been described but if desired, by the use of appropriate apparatus the speed of draw-off may be periodically increased and diminished so that the cross-sectional area of the materials will show a periodic variation along their length.

The spinning has been described with reference to the method of U. S. application S. No. 243,994, which has been found particularly suitable. Other methods of melt-spinning are available however including methods in which the thermoplastic material in fluid condition is metered to the die orifice.

In the examples the crimping was effected by immersing the spun material in water at a temperature of 95° C. in hank form. Other methods of subjecting the spun products to hot aqueous media while under little or no tension may be adopted, however. The filaments in the form of a substantially twistless tow or of a lightly twisted yarn may be laid as they are formed in open coils on a perforated travelling belt and carried by the belt first through a zone in which they are exposed to the hot aqueous medium, e. g. hot water or steam, especially wet steam, and then through a zone where the filaments are dried. Or the material on the travelling belt may be sprayed with water (which may contain any finish that is required on the material) and the belt may then carry the moist or wet material through a zone in which the water is heated to a sufficient temperature to bring out the crimp. Instead of treating the material in the form of continuous filaments it may be treated in the form of staple fibres. The fibres may be subjected to hot water or steam in a batch process carried out under atmospheric or superatmospheric pressure or in a continuous process. In one very convenient method the fibres are carried in suspension in a stream of hot water flowing through a long tube. Apparatus of the kind described in U. S. Patent No. 2,616,278 is very suitable for this purpose.

It is not essential for the aqueous medium used to effect the crimp to be at or near the boiling point. Provided the material has been spun so as to give it a pronounced tendency to crimp (according to the principles set out above) the crimp can be brought out by treatment with the aqueous medium at considerably lower temperatures. The effect of a relatively high temperature is in general not only to shorten the necessary time of treatment but also to increase the number of crimps per unit length. Thus, for example, filaments spun as described in Example 3 on soaking in water at 30° C. gained on the average four crimps per inch, whereas when the temperature of the water was boiling the average number of crimps per inch was ten and the crimping occurred almost instantaneously. In view of these advantages of relatively high temperatures, we prefer to carry out the crimping at a temperature of at least 60° C. and preferably at 80° C. or higher, e. g. 85 to 98° C. The water may contain penetrating agents, e. g. wetting agents and swelling agents for the thermoplastic material, with the object of enhancing the crimping effect. On the other hand, substances adapted to repress swelling and delustring, e. g. sodium sulphate, sodium acetate, sodium chloride or other salts that are without swelling effect on the material, may be present in solution in the water. Crimping may be effected in the course of saponification or other aqueous treatment of the materials, e. g. dyeing or bleaching. Suitable conditions for combined saponification and crimping are for example: treatment of the readily crimpable filaments in hank form in a 0.5% aqueous solution of caustic soda containing 5% of sodium acetate for one hour at 80° C.

Although hot water is the preferred crimping agent, other agencies capable of reducing the intermolecular forces in the material are also effective. Thus, for example, swelling agents such as methylene chloride, ethylene chloride and other chlorinated aliphatic hydrocarbons may be used. Much milder swelling agents than these, e. g. lower alcohols, can also be used, especially at elevated temperatures. Even the application of heat in the absence of any liquid or gaseous agents capable of being absorbed by the material may bring about the crimping providing that the materials have been spun under conditions that give a sufficiently strong tendency to crimping. Thus, for example, the material spun according to Example 3 may be crimped and delustred by heating to 220° C. for instance by exposure to hot air or immersion in a hot inert liquid such as oil. The quality of material crimped in this way is, however, greatly inferior to that in which the crimping is effected by exposure to a hot medium for which the material has some affinity, particularly a hot aqueous medium.

Instead of the thermoplastic materials specifically referred to, other thermoplastic fibre-forming material may be processed as described above. The best results have so far been obtained with materials the molecules of which are relatively rigid and held together by relatively strong forces. Preeminent among such materials are the thermoplastic fibre-forming derivatives of cellulose, especially the esters of carboxylic acids containing two to four carbon atoms, e. g. the acetates, propionates, butyrates, acetate-propionates and acetate-butyrates. The cellulose acetates that can be used may or may not be acetone-soluble. They include those containing more than 58% of combined acetic acid, e. g. 58–62%, as well as those containing lower proportions (e. g. 51 to 58 and especially 51 to 54%), of acetic acid. Very strong intermolecular forces may compensate for relatively low rigidity in the molecule as, for example, in the thermoplastic fibre-forming co-polymers of acrylonitrile and of vinylidene chloride such as the copolymers of acrylonitrile with vinyl chloride, with vinylidene chloride or with methacrylonitrile, and the copolymers of vinylidene chloride with vinyl chloride, and in the nylons, the polyurethanes, polyethylene terephthalate, poly-4-amino-1.2.4-triazoles and other crystalline fibre-forming condensation polymers. Similarly, very rigid molecules, as for example in polystyrene, may compensate for relatively low intermolecular forces. The material spun may contain dyes, pigments, delustrants and other effect materials. The presence of plasticizers for the thermoplastic material is in general unnecessary although in some cases an even greater crimping effect can be obtained when a plasticizer, especially a water soluble one, is present, but any plasticizer that is not extracted during the crimping should not be present in sufficient amount to reduce the tenacity of the fibres unduly.

The readily crimpable fibres of the present invention are believed to be broadly novel. The characteristic cross-sectional shapes of the fibres have been described above. In addition the fibres exhibit a special kind of anisotropy in that any transverse section of the fibres contains areas in which the material has been oriented to substantially different degrees.

The invention includes yarns and fabrics, especially woven and knitted fabrics, containing the readily crimpable fibres or continuous filaments, and/or the crimped fibres or continuous filaments of the invention, alone or in admixture with other textile materials. Interesting effects can be obtained by treating mixed yarns or fabrics containing the readily crimpable fibres or continuous filaments so as to bring out the crimp.

Having described our invention, what we desire to secure by Letters Patent is:

1. A process of melt-spinning which comprises urging cellulose acetate in powdered form against one side of a heated plate by intermittently applying mechanical pressure to the particles of cellulose acetate, said plate being perforated by an orifice, the cross-sectional shape of which comprises at least one narrow portion joining two wider portions, the width of each of said wider portions being at least 1.5 times that of said narrow portion continuously applying further quantities of the cellulose acetate to said plate, fusing the cellulose acetate by means of heat derived from said plate, and continuously drawing away the fused material in filament form from the orifice and through a region at a temperature below the heat-softening point of the cellulose acetate, at such a rate as to draw down said filament, the temperature of the plate round the edges of the aperture being between 290° and 325° C. and the draw-down of the filament being between 1000:1 and 3000:1.

2. Process according to claim 1, wherein the orifice is formed by a plurality of intersecting circles, the centres of all of which lie on a straight line, the area of the orifice is between 0.001 and 0.005 square inch, the temperature of the plate round the edges of the aperture is between 290 and 325° C., and the draw-down is between 1,000:1 and 3,000:1.

3. Process according to claim 1, wherein the orifice is formed by a plurality of intersecting circles, so arranged that a line joining the centre of two of said circles is at an angle to a line joining the centre of either of those circles to that of a third circle of the group, the area of the orifice is between 0.001 and 0.005 square inch, the temperature of the plate round the edges of the aperture is between 290 and 325° C., and the draw-down is between 1,000:1 and 3,000:1.

4. Process according to claim 1, wherein the orifice is formed by a plurality of intersecting circles, the centres of the circles being arranged along a substantially arcuate line, the area of the orifice is between 0.001 and 0.005 square inch, the temperature of the plate round the edges of the aperture is between 290 and 325° C., and the draw-down is between 1,000:1 and 3,000:1.

5. Process according to claim 1, wherein the orifice is formed by a plurality of intersecting circles, the centres of the circles being arranged along a zig-zag line, the area of the orifice is between 0.001 and 0.005 square inch, the temperature of the plate round the edges of the aperture is between 290 and 325° C., and the draw-down is between 1,000:1 and 3,000:1.

6. Process according to claim 1, wherein the orifice is formed by a plurality of intersecting circles, the centres of the circles being arranged along the arms of a cross, the area of the orifice is between 0.001 and 0.005 square inch, the temperature of the plate round the edges of the aperture is between 290 and 325° C., and the draw-down is between 1,000:1 and 3,000:1.

References Cited in the file of this patent

UNITED STATES PATENTS

| | | |
|---|---|---|
| 1,773,969 | Dreyfus et al. | Aug. 26, 1930 |
| 1,986,945 | Schwartz et al. | Jan. 8, 1935 |
| 2,041,798 | Taylor | May 26, 1936 |
| 2,238,977 | Jackson et al. | Apr. 22, 1941 |
| 2,243,843 | Finlayson et al. | June 3, 1941 |
| 2,282,568 | Finzel | May 12, 1942 |
| 2,369,506 | Weibel | Feb. 13, 1945 |
| 2,370,112 | Truitt | Feb. 20, 1945 |
| 2,387,791 | Hoffman | Oct. 30, 1945 |
| 2,408,381 | Dodge | Oct. 1, 1946 |

FOREIGN PATENTS

| | | |
|---|---|---|
| 438,283 | Great Britain | Nov. 21, 1935 |